(12) United States Patent
Han

(10) Patent No.: US 7,225,163 B1
(45) Date of Patent: May 29, 2007

(54) RECORDING/REPRODUCING DEVICE AND RECORDING/REPRODUCING METHOD

(75) Inventor: Min-Jae Han, Tokyo (JP)

(73) Assignee: Sony Corporation (JP)

( * ) Notice: Subject to any disclaimer, the term of this patent is extended or adjusted under 35 U.S.C. 154(b) by 345 days.

(21) Appl. No.: 09/319,093

(22) PCT Filed: Sep. 28, 1998

(86) PCT No.: PCT/JP98/04344

§ 371 (c)(1),
(2), (4) Date: Aug. 16, 1999

(87) PCT Pub. No.: WO99/18573

PCT Pub. Date: Apr. 15, 1999

(30) Foreign Application Priority Data

Oct. 2, 1997 (JP) ............................... P9-270164

(51) Int. Cl.
*G06Q 99/00* (2006.01)

(52) U.S. Cl. ............................. 705/52; 705/52; 705/53; 705/77; 705/78; 705/79; 705/1; 380/227; 380/228; 380/229; 380/230; 726/26; 726/27; 726/28; 726/29; 726/30

(58) Field of Classification Search ............ 705/52–53, 705/77–79, 1; 380/227–230; 713/153–154; 726/26–30
See application file for complete search history.

(56) References Cited

U.S. PATENT DOCUMENTS

| | | | | |
|---|---|---|---|---|
| 4,528,643 A | * | 7/1985 | Freeny, Jr. | ..................... 705/52 |
| 4,703,465 A | | 10/1987 | Parker | ........................... 369/30 |
| 4,964,109 A | * | 10/1990 | Yoshioka | .................. 369/44.29 |
| 5,084,790 A | * | 1/1992 | Endoh | ........................... 360/60 |
| 5,113,437 A | * | 5/1992 | Best et al. | ................... 380/253 |
| 5,481,411 A | * | 1/1996 | Nakatani | ........................ 386/4 |
| 5,850,527 A | * | 12/1998 | Suzuki | ................... 395/200.77 |
| 5,895,876 A | * | 4/1999 | Moriyama et al. | ............. 84/609 |
| 6,012,032 A | * | 1/2000 | Donovan et al. | ............... 705/1 |

FOREIGN PATENT DOCUMENTS

| | | |
|---|---|---|
| DE | 2429469 | 7/1975 |
| EP | 62277681 | 12/1987 |
| EP | 0309298 | 3/1989 |
| EP | 1113959 | 5/1989 |
| EP | 4178798 | 6/1992 |
| JP | 10177767 | 6/1998 |
| JP | 7296508 | 11/1998 |

* cited by examiner

*Primary Examiner*—Kambiz Abdi
(74) *Attorney, Agent, or Firm*—Lerner, David, Littenberg, Krumholz & Mentlik, LLP

(57) ABSTRACT

A high-speed dubbing unit 10 for dubbing digital data from an optical disk 15 to a hard disk 16 at a high speed is connected via a public telephone line to a payment imposing unit 20. A control unit 13 is provided for generating in its basic data generator 13B basic data for imposing the payment from at least data indicative of the user identification and data indicative of the speed for recording the data read out from the optical disk 15 into the hard disk 16 and transmitting the basic data to the payment imposing unit 20. The payment imposing unit 20 performs the imposing of the payment according to the basic data received from the control unit 13 and transmits data indicative of the completion of imposing the payment to the control unit 13. In response to the data indicative of the completion of the payment, the control unit 13 directs the high-speed dubbing unit 10 to start recording the data read out from the optical disk 15 into the hard disk 16.

18 Claims, 4 Drawing Sheets

RECORDING/REPRODUCING DEVICE AND RECORDING/REPRODUCING METHOD

TECHNICAL FIELD

The present invention relates to a record/playback apparatus and a record/playback method and particularly, to a record/playback apparatus and a record/playback method capable of switching the recording action in response to a payment action.

BACKGROUND ART

It is known in respect of protecting a copyright that copying digital data such as music software recorded on a given recording medium to another recording medium (referred to as "copying" or "dubbing" hereinafter) is permitted only one time or for one generation. Home audio systems are commonly designed capable of copying a group of digital data, e.g. of music play by a player, from an optical disk to a recording medium such as another optical disk, a magnetic disk, or a magnetic tape without change. However, such home audio systems permit no more copying of the digital data from the copied medium or source such as an optical disk, a magnetic disk, or a magnetic tape to a further recording medium.

The copying of such digital data may be dubbing at a common speed but not fast dubbing at a double or triple speed. In this application, the common speed is referred to as a recording speed or a recording and/or playback action where a group of data stored on an optical disk rotating at a standard speed specified by applicable standards is read out and played back with the use of a head and its playback data is recorded onto another optical disk rotating at the same speed. The double speed and triple speed are referred to as recording speeds or a recording and/or playback action where a group of data stored on an optical disk rotating at a speed two or three times faster than the standard speed is read out and played back with the use of a head and its playback data is recorded at two or three times faster clock onto another optical disk rotating at the speed two or three times faster than the standard speed. More particularly, such fast dubbing is technically feasible that the digital music data is read and copied from its optical disk rotating at the double or triple speed to a recording medium such as another optical disk, a magnetic disk, or a magnetic tape. For example, high-speed disk drives capable of playing back optical disks at eight or twelve times faster speed are now commercially available. There is a drawback that the copyright may be infringed if such high speed dubbing is permitted without rules.

For protecting the copyright, each action for high-speed dubbing of digital data is subjected to payment by the user. More specifically, infringement of the copyright is avoided when the high-speed dubbing of digital data is allowed only to the user who has fulfilled its payment. Practical means and arrangements for carrying out such payment for the high-speed dubbing have rarely been proposed so far.

It is thus an object of the present invention, in view of the foregoing aspects, to provide a record/playback apparatus and a record/playback method capable of permitting the high-speed dubbing of digital data on condition that a corresponding payment action has been done, hence preventing infringement of the copyright.

DISCLOSURE OF THE INVENTION

A record/playback apparatus according to the present invention comprises: a record/playback unit for reading out data from a first recording medium and recording it onto a second recording medium; a control unit for generating basic data for imposing the payment from at least data indicative of the user identification and data indicative of the speed for recording the data read out from the first recording medium onto the second recording medium and transmitting the basic data, and when receiving data indicative of the completion of imposing the payment, directing the record/playback unit in response to the received data indicative of the completion of imposing the payment to start the recording of the data read out from the first recording medium onto the second recording medium; and a payment imposing unit for when receiving the basic data from the control unit imposing of the payment according to the received basic data and transmitting to the control unit data indicative of the completion of imposing the payment.

A record/playback method according to the present invention is provided for reading out data from a first recording medium and recording it onto a second recording medium with the use of an apparatus capable of reading out the data from the first recording medium and recording it onto the second recording medium, which comprises the steps of: generating basic data for imposing payment from data indicative of the user identification and data indicative of the speed for recording the data read out from the first recording medium onto the second recording medium; transmitting the basic data from the apparatus to a payment imposing unit; imposing the payment according to the basic data received and generating data indicative of the completion of imposing the payment in the payment imposing unit; transmitting the data indicative of the completion of imposing the payment from the payment imposing unit to the apparatus; and directing the apparatus to start recording the data read out from the first recording medium onto the second recording medium in response to the data indicative of the completion of imposing the payment.

Another record/playback apparatus according to the present invention comprises: a record/playback unit for reading out data from a first recording medium and recording it onto a second recording medium; and a control unit for generating a basic data for imposing the payment from at least data indicative of the user identification and data indicative of the speed for recording the data read out from the first recording medium onto the second recording medium and transmitting the basic data, and when receiving data indicative of the completion of imposing the payment, directing the record/playback unit in response to the received data indicative of the completion of imposing the payment to start the recording of the data read out from the first recording medium onto the second recording medium.

Another record/playback method according to the present invention comprises the steps of: in response to indicator data received from an operating unit in an apparatus capable of reading out data from a first recording medium and recording it onto a second recording medium, reading out corresponding data from a data storage unit where a plurality of data is stored and recording it into the second recording medium; generating basic data for imposing the payment from data indicative of the user identification and data indicative of the speed for recording the data read out from the first recording medium onto the second recording medium for recording the data read out from the first recording medium onto the second recording medium; transmitting the basic data from the apparatus to a payment imposing unit; imposing the payment according to the basic data received and generating data indicative of the completion of imposing the payment in the payment imposing unit; transmitting the data indicative of the completion of imposing the payment from the payment imposing unit to the apparatus; and directing the apparatus to start recording the data read out from the first recording medium onto the second recording medium in response to the data indicative of the completion of imposing the payment.

A further record/playback apparatus according to the present invention comprises: a first unit for at least reading out data from a first recording medium; a second unit for at least recording the data onto a second recording medium; a control unit for generating basic data for imposing the payment from at least data indicative of the user identification and data indicative of the speed for recording the data read out from the first unit onto the second recording medium in the second unit, transmitting the basic data, and when receiving a data indicative of the completion of imposing the payment, directs the first and second units in response to the received data to start the recording of the data read out from the first unit onto the second recording medium in the second unit; and a payment imposing unit for receiving the basic data from the control unit, imposing the payment according to the basic data received, and transmitting the data indicative of the completion of imposing the payment to the control unit.

A further record/playback method according to the present invention is provided for reading out data from a first recording medium and recording it onto a second recording medium with the use of an apparatus capable of reading out the data from the first recording medium and recording it onto the second recording medium, which comprises the steps of: generating basic data for imposing the payment from data indicative of the user identification and data indicative of the speed for recording the data read out from the first recording medium onto the second recording medium; transmitting the basic data from the apparatus to a payment imposing unit; when the speed data in the basic data received is indicative of reading out the data from the first recording medium and recording it onto the second recording medium at the standard speed, canceling the imposing of the payment and generating a key data or when the speed data is indicative of reading out the data from the first recording medium and recording it into the second recording medium at a speed faster than the standard speed, imposing the payment and generating a key data; transmitting the data indicative of the completion of imposing the payment from the payment imposing unit to the apparatus; and directing the apparatus to start recording the data read out from the first recording medium onto the second recording medium in response to the data indicative of the completion of imposing the payment.

BEST MODE FOR CARRYING OUT THE INVENTION

Best modes for embodying the present invention will be described in more detail referring to the accompanying drawings.

Figure 1:
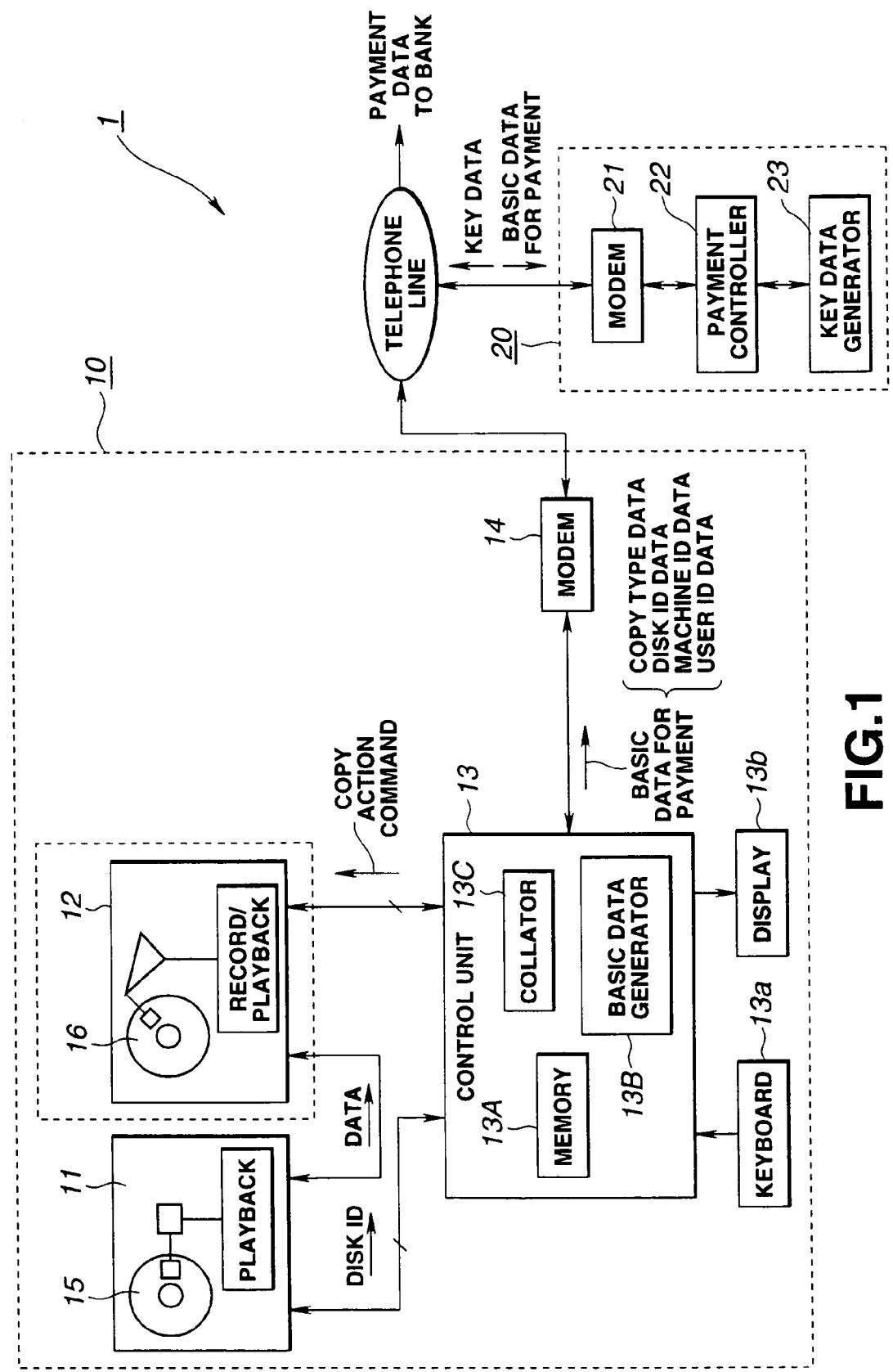
FIG. 1 is a block diagram of an embodiment of record/playback system according to the present invention.

The present invention is applicable to a record/playback system 1 having such a structure as shown in FIG. 1.

The record/playback system 1 shown in FIG. 1 comprises a high-speed dubbing unit 10 and a payment imposing unit 20. The high-speed dubbing unit 10 may be a home electric apparatus placed in the house of each user. The payment imposing unit 20 may locally be installed in a payment management center for controlling the payment actions. The high-speed dubbing unit 10 and the payment-imposing unit 20 in the record/playback system 1 are connected to each other by a public telephone line such as the integrated service digital network (ISDN). For ease of the description, a single high-speed dubbing unit 10 is illustrated in FIG. 1. In fact, a plurality of the high-speed dubbing units 10 are connected by the telephone line to the payment imposing unit 20.

The high-speed dubbing unit 10 is designed for dubbing (copying) a group of digital data at a high speed from a first recording medium or namely an optical disk 15 to a second recording medium or namely a hard disk 16 and comprises an optical disk drive 11 for playing back the digital data at a high, two or more times faster speed from the optical disk 15 which can be loaded and unloaded thereon, a hard disk drive 12 for storing the digital data from the optical disk 15 onto the hard disk 16 installed therein, a controller 13 for controlling the operation of the high-speed dubbing unit 10, and a modem 14 for communication with the payment imposing unit 20 via the public telephone line.

The optical disk drive 11 allows the optical disk 15, e.g. a compact disk or a CD-ROM, to be loaded and unloaded thereon and has a function for rotating the optical disk 15 not only at the prescribed standard speed but also at an eight- or twelve-times faster speed for playback. More specifically, the optical disk drive 11 reads out the digital data from the optical disk 15 at a speed of N-times faster than the standard data rate which may, for example, be 150 Kbytes per second (N being a natural number).

Upon receiving a control signal from the controller 13, the optical disk drive 11 determines the value of N or how many times faster a speed is used for rotating the optical disk 15 before starting the playback action. The optical disk 15 loaded onto the optical disk drive 11 carries in its main data storage region data of music played by players and in its control data storage region (referred to as TOC region hereinafter) ID data for identifying the optical disk (referred to as disk ID data). In response to the control signal from the controller 13, the optical disk drive 11 reads out the control data from the TOC region of the optical disk 15 and picks up and sends the disk ID data to the controller 13.

The hard disk drive 12 is designed for recording the data received from the optical disk drive 11 onto the hard disk 16 using a magnetic head not shown. In response to a copy action command from the controller 13, the hard disk drive 12 starts dubbing or copying on the hard disk 16.

In one embodiment of the present invention, the hard disk drive 12 is employed of a specific type which allows no exchange of the hard disk. It is however understood that another type of hard disk drive which permits the exchange of the hard disk may be used with equal success.

The controller 13 may be a personal computer including a main body, a keyboard 13a, and a monitor 13b. The controller 13 controls the operation of the high-speed dubbing unit 10 using a control program stored in a memory 13A which may be a ROM of the personal computer.

At the start of dubbing action on the high-speed dubbing unit 10, the value of N determining the playback speed of the optical disk drive 11 is entered by the user manipulating the keyboard 13a and saved temporarily as copy format data in the memory 13A of the controller 13. Also, by the user manipulating the keyboard 13a, the ID data of both the hard disk drive 12 and the user are registered and saved in the memory 13A of the controller 13 in advance.

To start the dubbing, the controller 13 in response to key movements on the keyboard 13a drives the optical disk drive 11 to be played back. Upon receiving the disk ID data from the optical disk drive 15, the controller 13 reads out the copy format data or the value of N, the machine ID data of the hard disk drive 12, and the user ID data from the memory 13A. The controller 13 then drives the modem 14 to transmit at one time the two ID data and the value of N as a basic data for the payment from its basic data generator 13B to the payment imposing unit 20 via a public telephone line.

The memory 13A in the controller 13 holds key lock data for giving permission for the dubbing which has been registered and saved in advance. In the controller 13, the key lock data saved in the memory 13A is collated by a collator 13C with a key data which is supplied from the payment imposing unit 20 and temporarily saved in the memory 13A such as a RAM as described layer in more detail. When the key data corresponds to the key lock data, the controller 13 starts the dubbing. More specifically, the controller 13 supplies the optical disk drive 11 with the control signal to start the N-times speed playback action on the optical disk 15 and simultaneously delivers the copy action command to the hard disk drive 12 for dubbing the data from the optical disk drive 11 to the hard disk 16.

The payment imposing unit 20 comprises a modem 21 for communication with the high-speed dubbing unit 10 via the telephone line, a payment imposing controller 22 for imposing payment prior to the dubbing in the high-speed dubbing unit 10, and a key data generator 23 for producing key data from the basic data including the ID data and the value of N and supplied by the high-speed dubbing unit 10.

The payment imposing controller 22 is designed for imposing the payment prior to the dubbing and in response to the basic data including the disk ID data, the copy format data or the value of N, and the user ID data and the machine ID data of the hard disk drive 12 which all are supplied from the high-speed dubbing unit 10. More particularly in the payment imposing controller 22, the copyright holder, for example, of the optical disk 15 for which the payment is imposed is specified from the disk ID data and then, the user to whom the payment is imposed is identified from the user ID data and the machine ID data of the hard disk drive 12. The payment imposing controller 22 also determines the amount of the payment to be imposed from the copy format data or the value of N. When imposing payment in the payment imposing controller 22, for example, the higher the value of N in the copy format data is, the more the amount of the payment is increased.

Upon determining the amount of the payment, the payment imposing controller 22 draws a sum of money for the payment from the back account of the user to whom the payment is imposed under an automatic withdrawal agreement and transfers it to the copyright holder or more particularly, to the back account specified by the copyright holder. When the value of N supplied from the controller 13 is "1", the payment imposing controller 22 judges that the dubbing is not of high-speed but of the standard speed and imposes no payment.

The key data generator 23 generates key data for permitting the dubbing at a speed of N-times faster in accordance with the basic data including the disk ID data, the user ID data, and the machine ID data of the hard disk drive 12 which all are supplied by the high-speed dubbing unit 10. When the action for payment in the payment imposing controller 22 has been finished or the value of N is found "1", the key data generator 23 directs the modem 21 to transmit the key data to the high-speed dubbing unit 10. The key data generated by the key data generator 23 is of a specific type which is never produced in the high-speed dubbing unit 10.

A procedure of permitting the N-times faster speed dubbing in the record/playback system 1 will now be described referring to the flowchart shown in FIG. 2.

In the record/playback system 1, the procedure for the N-times faster speed dubbing is commenced by the user, e.g., pressing or turning on the return key on the keyboard 13a of the high-speed dubbing unit 10. At Step S1, the controller 13 of the high-speed dubbing unit 10 is in the standby mode waiting for the basic data. More particularly, when the control signal is generated by the user manipulating the keyboard 13a and delivered from the controller 13 to the optical disk drive 11 in the high-speed dubbing unit 10, the optical disk 15 in the optical disk drive 11 starts its playback action. The optical disk drive 11 reads out the control data from the TOC region of the optical disk 15 and transmits its disk ID data to the controller 13. In response, the controller 13 reads out the user ID data and the machine ID data of the hard disk drive 12 from its memory 13A. Also, the controller 13 instructs the monitor 13b to display a message, "How many times faster speed a is used for the dubbing?", for requesting the user to enter the value of N to generate the copy format data, and enters itself the standby mode waiting for the entry action of the user with the keyboard 13a. When the value of N is entered by the user, the basic data generator 13B of the controller 13 generates the copy format data. This allows the basic data for imposing the payment to be produced from the prescribed ID data, the disk ID data, and the copy format data or the value of N. As the basic data has been produced in the controller 13, the procedure goes to Step S2.

At Step S2, the controller 13 drives the modem 14 to transmit the basic data for imposing the payment from the basic data generator 13B to the payment imposing unit 20 via a public telephone line. The basic data for imposing the payment transmitted from the high-speed dubbing unit 10 is received by the modem 21 and transferred to the payment imposing controller 22 of the payment imposing unit 20 in the record/playback system 1. The payment imposing controller 22 then examines whether the copy format data or the value of N in the basic data for imposing the payment is "1" or not (Step S3). When it is judged at Step S3 that the value of N is "1", the procedure skips Step S4 for imposing the payment and moves to Step S5. When the value of N is greater than "1" at Step S3, the procedure advances to Step S4 where the payment is imposed.

In the payment imposing unit 20, the payment imposing controller 22 identifies both the copyright holder of the optical disk 15 and the user to whom payment is imposed and calculates and determines the amount of the payment from the basic data. Then, for example, it draws a sum of money calculated and determined for the payment from the bank account of the user to whom payment is imposed and transfers it to the bank account of the copyright holder to be paid (Step S4).

In succession, the key data is generated by the key data generator 23 in the payment imposing unit 20 and delivered from the modem 21 to the high-speed dubbing unit 10 (Step S5). Accordingly, the key data delivered from the payment imposing unit 20 is received by the modem 14 and transferred to the controller 13 of the high-speed dubbing unit 10 in the record/playback system 1.

The key data is temporarily saved in the memory 13A of the controller 13 and transferred to the collator 13C where it is collated with the key lock data registered and stored in advance in the memory 13A. This collation includes examining whether or not the key data is authentic as produced from the basic data supplied previously for imposing the payment while the key lock data has been designated identical to the basic data (Step S6). When it is judged that the key data is authentic, the controller 13 supplies the optical disk drive 11 with its control signal for starting the playback action at an N-times faster speed on the optical disk 15 according to the value of N stored in the memory 13A of the controller 13 and simultaneously, the hard disk drive 12 with its dubbing command for starting the dubbing at the N-times faster speed (Step S7). As a result, the high-speed dubbing unit 10 is allowed to perform the high-speed dubbing of digital data from the optical disk drive 11 to the hard disk 16. When it is judged at Step S6 that the key data received is not authentic, the dubbing is canceled.

In the record/playback system 1, the controller 13 of the high-speed dubbing unit 10 prohibits the N-times faster speed dubbing of digital data from the optical disk drive 11 to the hard disk drive 12 until the payment imposed by the payment imposing unit 20 is fulfilled. Accordingly, the record/playback system 1 allows the high-speed dubbing to be carried out only when the payment has been fulfilled, hence ensuring no infringement of the copyright.

Figure 2:
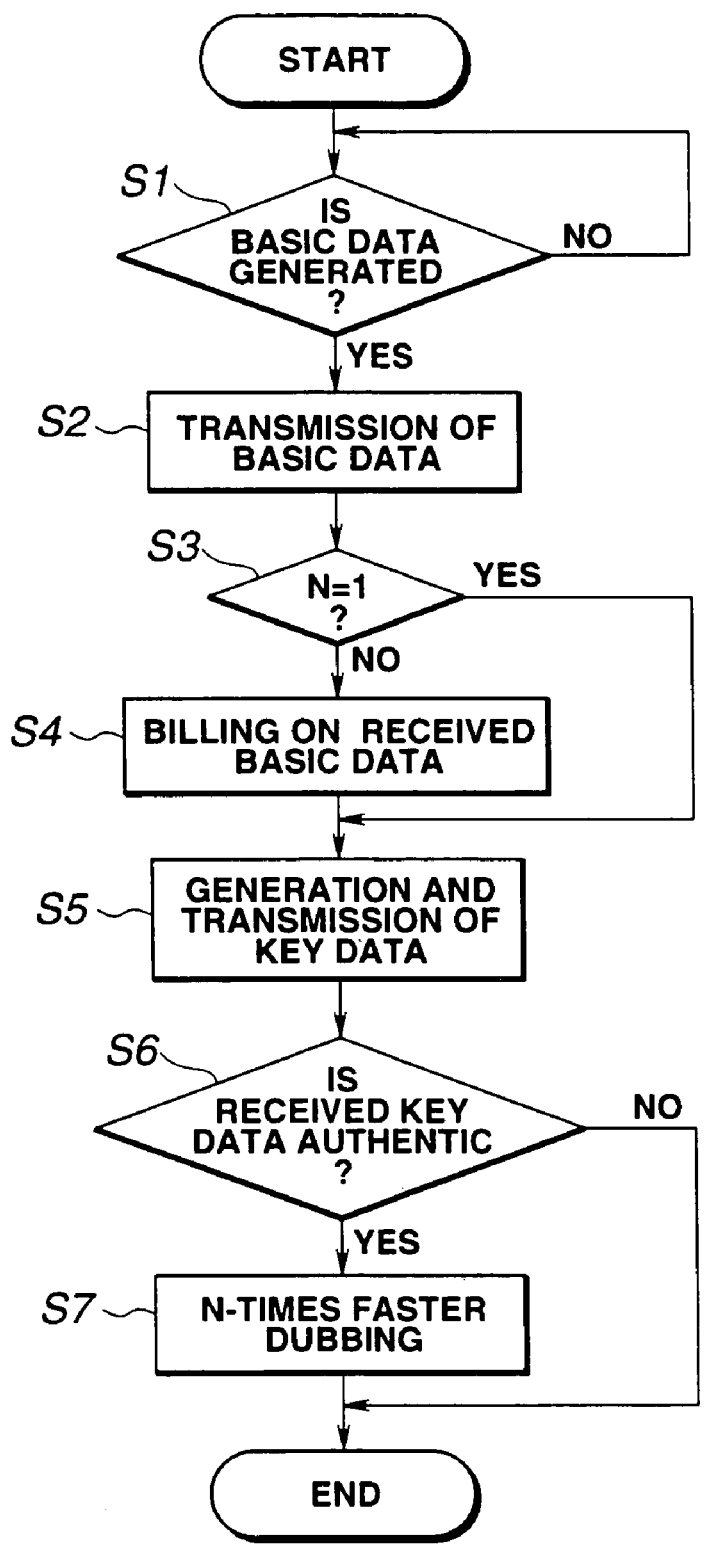
FIG. 2 is a flowchart showing an exemplary procedure for N-times speed dubbing.

Although the procedure shown in the flowchart of FIG. 2 cancels the dubbing when Step S6 judges that the key data is not authentic, it may be modified for returning to Step S1 and repeating the steps from S1 to S6.

Figure 3:
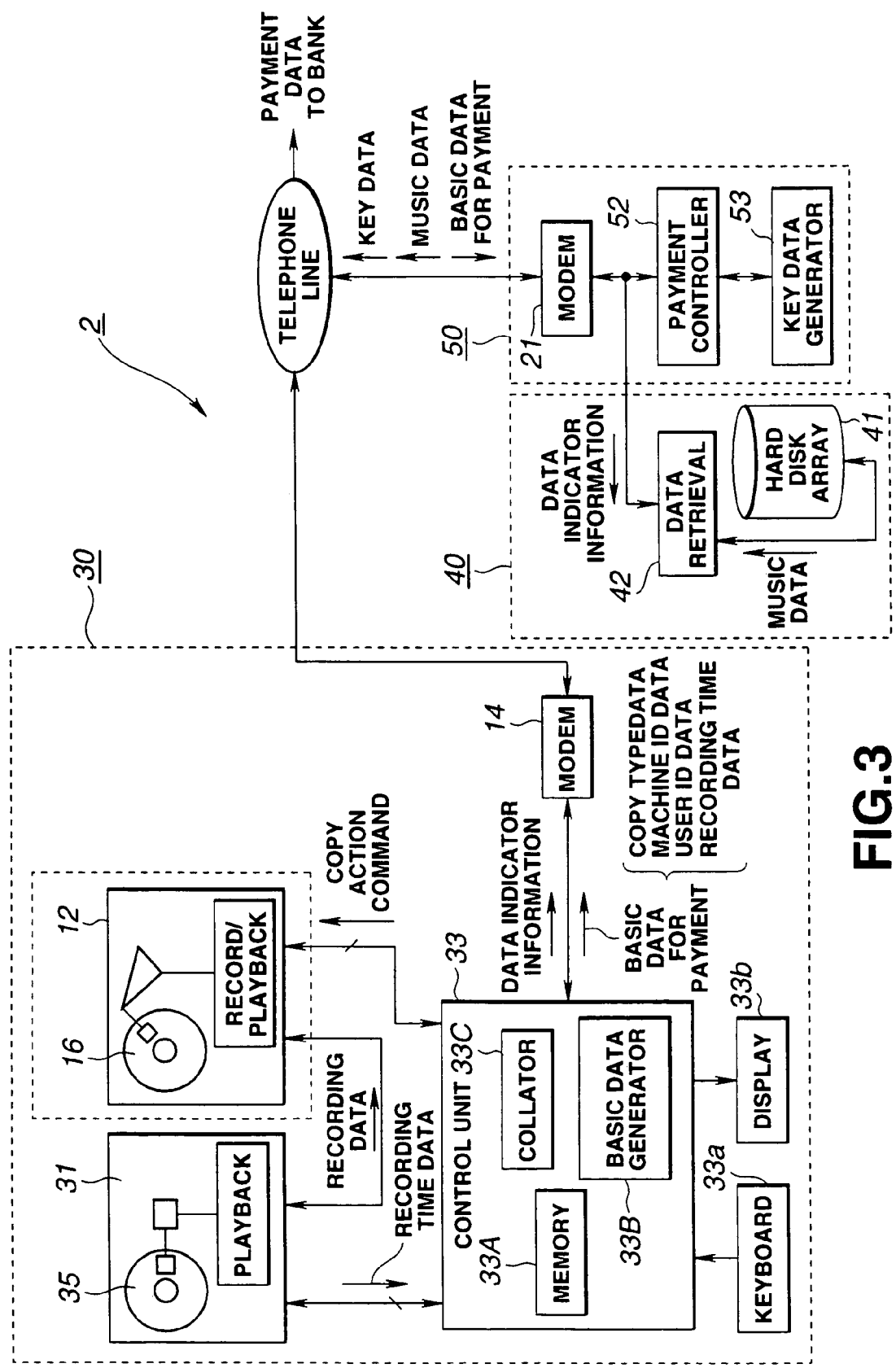
FIG. 3 is a block diagram of another embodiment of a record/playback system according to the present invention.

A second embodiment of the record/playback system according to the present invention will be described referring to FIG. 3. Like components are denoted by like numerals as those in the first embodiment and will be explained in no more detail. As shown in FIG. 3, the record/playback system 2 comprises a high-speed dubbing unit 30, a data transmitter unit 40, and a payment imposing unit 50. The data high-speed dubbing unit 30 may be a home electric apparatus installed in a house of the user. The data transmitter unit 40 and the payment imposing unit 50 are located in a data control center of the host side or a local payment control center like that of the first embodiment. In the record/playback system 2, the data transmitter unit 40 and the payment imposing unit 50 share the use of a modem 21 and are thus connected to each other by a public telephone line such as the ISDN network. For ease of the description, the high-speed dubbing unit 30 is shown as one unit in FIG. 3. In fact, a plurality of the high-speed dubbing units 30 are communicated via the telephone line network with the data transmitter unit 40 and the payment imposing unit 50 of the host side.

The high-speed dubbing unit 30 like the high-speed dubbing unit 10 in the first embodiment is designed for dubbing a group of digital data at a higher speed from a first recording medium or an optical disk to a second recording medium or a hard disk. The optical disk 35 in the second embodiment is adapted for playing back as well as recording. More particularly, the high-speed dubbing unit 30 of the second embodiment comprises an optical disk drive 31 for recording and playing back at the standard speed on the optical disk 35 and for playing back at a high speed of two or more times faster than the standard speed on the same, a hard disk drive 12 for dubbing data from the optical disk 35 to a hard disk 16, a controller 33 for controlling the operation of the entire system, and a modem 14 for communication with the payment imposing unit 50 and the data transmitter unit 40. The optical disk 35 in the optical disk drive 31 may be replaced with another optical disk.

The optical disk drive 31 is responsive to a control signal from the controller 33 for recording and playing back data with the use of head devices not shown on the optical disk 35 which may be an optical magnetic disk of record/playback type. Also, the optical disk drive 31 records a group of data such as music data supplied from the data transmitter unit 40 on a main data storage region of the optical disk 35 and data of the time when the music data is recorded (referred to as a recording time data hereinafter) on a TOC region of the same, as described later in more detail.

The optical disk drive 31 is capable of carrying out a high-speed playback action at an N-times faster speed, e.g., an eight times or twelve times faster speed, as well as a common playback action at the standard speed. In the optical disk drive 31, it is determined from the control signal of the controller 33 the value of N or how many times faster than the standard speed is used for driving the optical disk 35 and then the playback at the N-times faster speed defined by the control signal from the controller 33 is commenced. More specifically, the optical disk drive 31, when starting the playback action in response to the control signal from the controller 33, reads out the recording time data from the TOC region of the optical disk 35 and delivers it to the controller 33.

The controller 33 comprises a personal computer and its associated devices including a keyboard 33a and a monitor 33b. The controller 33 also has a memory, e.g., a ROM in the personal computer, loaded with a communication program for receiving the music data from the data transmitter unit 40 via the telephone line. The action of the controller 33 is controlled by the communication program to drive the modem 14 and the optical disk drive 31.

More particularly, the controller 33 controls the action of the optical disk drive 31, the modem 14, and other devices in the high-speed dubbing unit 30. When the player name and title of music data of interest are entered by the user manipulating the keyboard 33a, the controller 33 generates indicator data indicative of the desired music data which is then transmitted from the modem 14 to the data transmitter unit 40. The controller 33 also controls the recording of the music data, supplied from the data transmitter unit 40 as described later, on the optical disk 35.

The memory 33A, e.g., a ROM, of the controller 33 like the controller 13 of the first embodiment holds a control program for controlling the action of the high-speed dubbing unit 30. More particularly, when the value of N for determining the speed of playback on the optical disk drive 31 is entered by the user manipulating the keyboard 33a prior to starting the dubbing of the high-speed dubbing unit 30, it is temporarily saved as copy format data in the memory 33A of the controller 33. Also by the user manipulating the keyboard 33a, both the user ID data and the machine ID data of the hard disk drive 12 are registered in advance and stored in the memory 33A of the controller 33.

To start the dubbing, the controller 33 directs the optical disk drive 31 to play back, in response to the key movements of the keyboard 33a, and read out the recording time data from the optical disk 15 as well as the copy format data or the value of N and the user ID data and the machine ID data of the hard disk drive 12 from the memory 33A. The controller 33 then drives the modem 14 to transmit that data including the two ID data and the value of N as basic data for imposing the payment at one time from its basic data generator 33B via the telephone line to the payment imposing unit 50.

The memory 33A of controller 33 holds a key lock data for permitting the dubbing at an N-times faster speed. The controller 33 temporarily saves the key data from the payment imposing unit 50, described later, in the memory 33A and then drives a collator 33C to collate the key data with the key lock data stored in the memory 33A. When the key data corresponds to the key lock data, the controller 33 starts the dubbing. More specifically, the controller 33 supplies the optical disk drive 31 with the control signal for starting the playback action at the N-times faster speed on the optical disk 35 and simultaneously, the hard disk drive 12 with the copy command for dubbing data from the optical disk drive 31 to the hard disk drive 16.

The data transmitter unit 40 is a host side apparatus for performing known music-on-demand action, which comprises a hard disk array 41 for holding a great volume of music data and a data retrieving processor 42 arranged responsive to the user demand for retrieving music data desired by the user from the hard disk array 41 and supplying it to the user.

Upon receiving indicator data including the player name and the tile of the desired music data from the high-speed dubbing unit 30, the data retrieving processor 42 retrieves the music data specified by the indicator data from the hard disk array 41. The data retrieving processor 42 then sends the music data specified by the indicator data via a modem 21 of the payment imposing unit 50 to the high-speed dubbing unit 30.

The payment imposing unit 50 comprises, in addition to the modem 21 for data communication with the high-speed dubbing unit 30 via the telephone line, a payment imposing controller 52 for imposing the payment prior to the dubbing at an N-times faster speed in the high-speed dubbing unit 30 and a key data generator 53 for generating the key data according to the basic data including the value of N and the ID data and supplied from the high-speed dubbing unit 30 for imposing the payment.

Prior to the dubbing, the payment imposing controller 52 imposes the payment depending on the basic data which is supplied from the high-speed dubbing unit 30 and includes the copy format data or the value of N, the user ID data, the machine ID data of the hard disk drive 12, and the recording time data. More particularly, the payment imposing controller 52 identifies the user to whom payment is imposed from the user ID data and the machine ID data of the hard disk drive 12 and calculates and determines the amount of the payment from the copy format data in the same manner as the payment imposing controller 22 of the first embodiment shown in FIG. 1.

The payment imposing controller 52 also specifies the copyright holder to whom the payment is paid from the recording time data supplied by the high-speed dubbing unit 30. In the payment imposing controller 52, the copyright holder is specified by referring the result of retrieval action of the data retrieving processor 42 in the data transmitter unit 40 and examining the content of music data transferred from the data transmitter unit 40 to the high-speed dubbing unit 30 at a time defined by the recording time data received from the high-speed dubbing unit 30.

The recording time data in the second embodiment is equivalent to the disk ID data in the record/playback system 1 shown in FIG. 1 and used in the payment imposing unit 50 for identifying the copyright holder to whom the payment is paid. It is thus understood that the basic data for imposing the payment is not limited to the recording time data in the record/playback system 2 but includes any other data capable of identifying the copyright holder or those who receive the payment for digital data recorded on the optical disk 35 in the high-speed dubbing unit 30.

Accordingly, the payment imposing controller 52 draws a sum of money for the payment determined by the above process from the bank account of the user or those to whom the payment is imposed under an automatic payment agreement and transfers it to the copyright holder or more particularly, to the bank account specified by the copyright holder. When the value of N received from the controller 33 is "1", the payment imposing controller 52 judges that the dubbing is at the standard speed but not a high speed and cancels imposing the payment.

The key data generator 53 produces the key data for allowing the dubbing at an N-times faster speed from the basic data for imposing the payment including the copy format data or the value of N, the user ID data, the machine ID data of the hard disk drive 12, and the recording time data and supplied from the high-speed dubbing unit 30. When the action of imposing the payment in the payment imposing controller 52 has been completed or it is found that the value of N is "1", the key data generator 53 directs the modem 21 to transmit the key data to the high-speed dubbing unit 30. The key data to be generated is of a particular type which is never produced in the high-speed dubbing unit 30.

Figure 4:
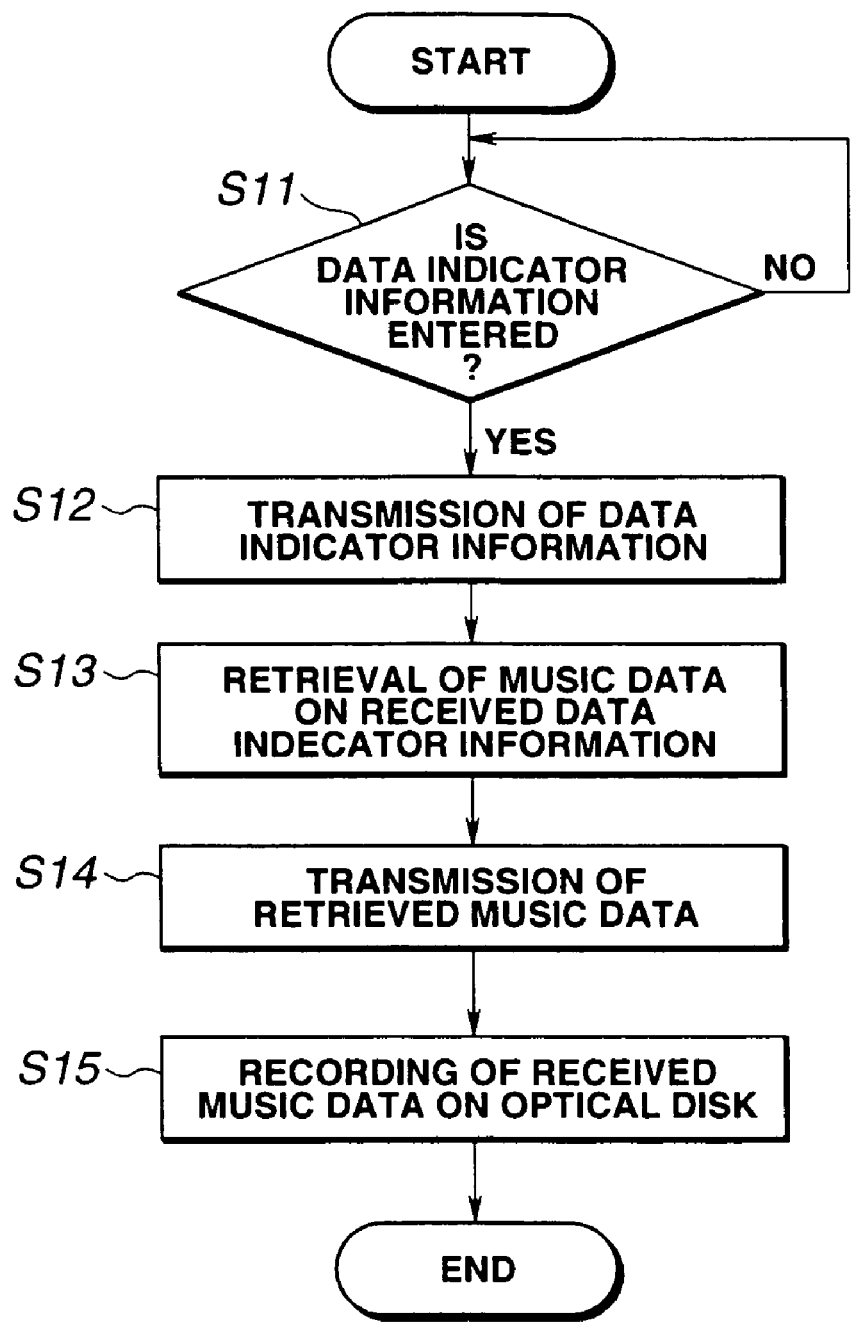
FIG. 4 is a flowchart showing an exemplary procedure for acquisition by the user of music data with the record/playback system.

A procedure of receiving the music data by the user in the record/playback system 2 of the foregoing arrangement will now be described referring to the flowchart of FIG. 4.

In the record/playback system 2, the communication program stored in the memory of the controller 33 in the high-speed dubbing unit 30 is started by the user manipulating the keyboard 33a. Then, the controller 33 in the high-speed dubbing unit 30 is turned to a standby mode waiting for entry of primary information by the user (Step S11). More specifically, the controller 33 waits for the player name and the title of music data desired by the user from the keyboard 33a. Upon receiving the primary information entered by the user manipulating the keyboard 33a, the controller 33 generates the indicator data indicative of the primary information and advances the procedure to Step S12.

The indicator data produced by the controller 33 is transmitted from the modem 14 in the high-speed dubbing unit 30 to the data transmitter unit 40 (Step S12). Accordingly, the indicator data transmitted from the high-speed dubbing unit 30 over the telephone line is received by the modem 21 of the payment imposing unit 50 and transferred to the data retrieving processor 42 of the data transmitter unit 40 in the record/playback system 2.

In response to the indicator data, the data retrieving processor 42 in the data transmitter unit 40 carries out the retrieval of a music data specified by the indicator data among the music data stored in the hard disk array 41 (Step S13). The music data specified by the information data and retrieved with the data retrieving processor 42 is then transmitted to the high-speed dubbing unit 30 (Step S14). By now, the recording time data is received and held by the data transmitter unit 40, the payment imposing unit 50, or the modem 21. This allows the music data released from the data transmitter unit 40 to be conveyed to the modem 14 in the high-speed dubbing unit 30 and further transferred to the controller 33.

The controller 33 in the high-speed dubbing unit 30 then transfers the music data as recording data to the optical disk drive 31 where it is recorded onto the optical disk 35 (Step S15). The recording of the music data onto the optical disk 35 in the high-speed dubbing unit 30 is equivalent to downloading of the music data from the data transmitter unit 40. The downloading of the music data desired by the user from the data transmitter unit 40 to save on the optical disk 35 involves imposing the payment of a sum of money to the user for each title of the music data.

A procedure of dubbing the downloaded music data from the optical disk 35 to the hard disk 16 at the N-times faster speed will be described referring to the flowchart of FIG. 2.

In the record/playback system 2 like the record/playback system 1 shown in FIG. 1, the N-times faster speed dubbing starts, e.g., when a return key on the keyboard 33a of the high-speed dubbing unit 30 is pressed or switched on by the user. At Step S1, the controller 33 in the high-speed dubbing unit 30 is turned to the standby mode waiting for generation of the basic data for imposing the payment. More particularly, the control signal is generated in the controller 33 by the user manipulating the keyboard 33a and transmitted to the optical disk drive 31 for starting the playback action on the optical disk 35 in the high-speed dubbing unit 30. The optical disk drive 31 accesses the control data stored in the TOC region of the optical disk 35, reads out the recording time data from the TOC region and sends it to the controller 33. In response, the controller 33 reads out the user ID data and the machine ID data of the hard disk drive 12 from its memory 33A. Also, the controller 33 directs the monitor 33b to display a message, "How many times faster than the standard speed is used for the dubbing?" for determining the value of N to generate the copy format data and is turned to the standby mode waiting for entry of information for the value of N from the keyboard 33a. When the value of N is determined and entered by the user manipulating the keyboard 33a, the basic data generator 33B in the controller 33 produces the copy format data from the value of N and combines it with the ID data and the recording time data to have the basic data for imposing the payment. As the basic data for imposing the payment has been made by the controller 33, the procedure moves to Step S2.

At Step S2, the controller 33 drives the modem 14 to transmit the basic data for imposing the payment from its basic data generator 33B via the telephone line to the payment imposing unit 50. The basic data for imposing the payment transmitted from the high-speed dubbing unit 30 is then received by the modem 21 and transferred to the payment imposing controller 52 of the payment imposing unit 50 in the record/playback system 2. It is examined by the payment imposing controller 52 whether the copy format data or the value of N in the basic data is "1" or not (Step S3). When it is judged at Step S3 that the copy format data is "1", the procedure skips over Step S4 for imposing the payment and goes to Step S5. When Step S3 judges that the copy format data is greater than "1", the procedure advances to Step S4 for imposing the payment.

Upon receiving the basic data for imposing the payment, the payment imposing controller 52 in the payment imposing unit 50 identifies the copyright holder or those who claim the payment for the optical disk 35 and calculates and determines the amount of the payment, for example, in order to withdraw a sum of money defined by the payment from the bank account of those who claim the payment and transfer it to the bank account of the copyright holder (Step S4). In the second embodiment, the copyright holder or those who receive the payment is identified by collating an instant of time when the music data is transferred from the data transmitter unit 40 to the high-speed dubbing unit 30 with the recording time data saved in either the data transmitter unit 40 or the payment imposing unit 50.

Succeedingly, the key data is generated by the key data generator 53 in the payment imposing unit 50, as described, and transmitted from the modem 21 to the high-speed dubbing unit 30 (Step S5). The key data from the payment imposing unit 50 is then received by the modem 14 and transferred to the controller 33 of the high-speed dubbing unit 30 in the record/playback system 2.

The key data is temporarily saved in the memory 33A of the controller 33 and collated by the collator 33C with the key lock data stored in the memory 33A of the controller 33 in the high-speed dubbing unit 30 (Step S6). The collation may be carried out by the same manner as of the record/playback system 1 of the first embodiment.

When it is judged that the key data received is authentic, the controller 33 supplies the optical disk drive 31 with its control signal for starting the playback action at the N-times faster speed on the optical disk 35 according to the value of N stored in the memory of the controller 33 and simultaneously, the hard disk drive 12 with its dubbing action command for dubbing at the N-times faster speed (Step S7). This permits the high-speed dubbing unit 30 to perform the high-speed dubbing of digital data from the optical disk drive 31 to the hard disk 16. When it is judged at Step S6 that the key data received is not authentic, the dubbing is canceled.

In the record/playback system 2 like the record/playback system 1 of the first embodiment, the controller 33 of the high-speed dubbing unit 30 prohibits the dubbing of digital data at the N-times faster speed from the optical disk drive 31 and the hard disk drive 12 until the imposing the payment by the payment imposing unit 50 is completed. Accordingly, the record/playback system 2 permits the high-speed dubbing of digital data on condition that the payment is imposed, thus ensuring no infringement of the copyright.

The present invention is not limited to the embodiments shown in FIGS. 1 and 3 where the optical disk drive is used for carrying out the playback action on the first recording medium in the high-speed dubbing unit. It is apparent that a hard disk drive or any other applicable drive may be utilized with equal success.

In each of the embodiments, the communication between the high-speed dubbing unit and the payment imposing unit is enabled when the dubbing at the standard speed or one-time faster speed is conducted. It is possible to permit the common dubbing at the standard speed with the high-speed dubbing unit delivering none of the basic data for imposing the payment. In this case, the procedure may be modified by inserting an additional step for examining whether the value of N is "1" or not between Step S1 for waiting for generation of the basic data and Step S2 for transmitting the basic data shown in FIG. 2. It should also be arranged 50 that when it is judged that the value of N is "1", the procedure jumps to Step S7 and when not, goes to Step S2.

It is understood that the digital data to be subjected to the N-times faster speed dubbing according to the present invention is not limited to the music data in the embodiments and may be motion image data of a movie and/or audio data, still image data, and so on. Although the data is read out from the optical disk and recorded into the hard disk drive in the embodiments described above, its recording medium is not limited to the hard disk but may be a magnetic tape, a recordable optical disk, or a semiconductor memory.

The invention claimed is:

1. A record/playback apparatus comprising:
a record/playback unit configured to read out data from a first recording medium and recording the data onto a second recording medium;
a control unit configured to generate basic data for imposing payment based on a copyright holder ID read from a control data storage region (TOC) of the first recording medium, data indicative of a user identification, and data indicative of a dubbing speed selected by the user for recording the data read out from the first recording medium onto the second recording medium and configured to transmit the basic data for imposing payment, and when receiving data indicative of proper completion of imposing payment, configured to cause the record/playback unit to start the recording of the data read out from the first recording medium onto the second recording medium at the dubbing speed selected by the user; and
a payment imposing unit configured to determine, when receiving the basic data for imposing payment transmitted by the control unit an amount of payment based on the dubbing speed selected by the user and the copyright holder ID, and configured to transmit to the control unit the data indicative of proper completion of imposing payment when an electronic transfer of funds equal to the determined amount of payment is withdrawn from an account of the user and transferred to an account specified by the copyright holder ID,
wherein the control unit causes, when the dubbing speed is a standard dubbing speed, the record/playback unit to start the recording of the data read out from the first recording medium onto the second recording medium at the standard dubbing speed without transmitting the basic data to said payment imposing unit.

2. The record/playback apparatus according to claim 1, wherein the payment imposing unit includes a key data generator for generating key data as the data indicative of the completion of imposing payment from the received basic data.

3. The record/playback apparatus according to claim 2, wherein the control unit judges whether the key data received from the payment imposing unit as the data indicative of completion of imposing payment is authentic and controls operation of the record/playback unit with a result of the judgment.

4. The record/playback apparatus according to claim 3, wherein the control unit collates the key data received from the payment imposing unit as the data indicative of completion of imposing payment with key lock data stored therein and, when it is found from the collation that the key data is authentic, directs the record/playback unit to start the recording of the data read out from the first recording medium onto the second recording medium.

5. The record/playback apparatus according to claim 4, wherein the control unit, when the key data is judged authentic, directs the record/playback unit in response to the data indicative of a speed to record the data read out from the first recording medium onto the second recording medium.

6. The record/playback apparatus according to claim 2, wherein the payment imposing unit, when the data indicative of a speed in the basic data received from the control unit is indicative of reading out data from the first recording medium and recording the data read out from the first recording medium onto the second recording medium at a predetermined speed, cancels imposing payment and generates the key data.

7. The record/playback apparatus according to claim 6, wherein the payment imposing unit, when the data indicative of a speed in the basic data received from the control unit is indicative of reading out data from the first recording medium and recording the data read out from the first recording medium onto the second recording medium at a speed faster than the standard speed, imposes payment and generates the key data.

8. The record/playback apparatus according to claim 1, further comprising:
an operating unit connected to the control unit; and
a data storage unit where a plurality of data is stored, wherein the control unit reads out corresponding data from the data storage unit in response to indicator data supplied in response to an information input from the operating unit and directs the record/playback unit to record the data read out from the data storage unit onto the first recording medium.

9. The record/playback apparatus according to claim 1, wherein the payment imposing unit is connected via a communications line to the control unit.

10. The record/playback apparatus according to claim 1, wherein the payment imposing unit is connected via a communications line to the control unit.

11. A record/playback method of reading out data from a first recording medium and recording the data onto a second recording medium with the use of an apparatus capable of reading out the data from the first recording medium and recording the data onto the second recording medium, the method comprising the steps of:
generating basic data for imposing payment based on a copyright holder ID read from a control data storage region (TOC) of the first recording medium, data indicative of a user identification, and data indicative of a dubbing speed selected by the user for recording the data read out from the first recording medium onto the second recording medium;
transmitting the basic data for imposing payment from the apparatus to a payment imposing unit;
imposing payment according to the basic data for imposing payment received, with an amount of payment determined based on the dubbing speed selected by the user, the copyright holder ID, and the user identification and for generating data indicative of proper completion of imposing payment when an electronic transfer of funds equal to the determined amount of payment is withdrawn from an account of the user in the payment imposing unit and transferred to an account specified by the copyright holder ID;
transmitting the data indicative of the proper completion of imposing payment from the payment imposing unit to the apparatus; and
controlling the apparatus to start recording the data read out from the first recording medium onto the second recording medium at the dubbing speed selected by the user in response to the data indicative of the proper completion of imposing payment, wherein the controlling step includes controlling the apparatus to start the recording of the data read out from the first recording medium onto the second recording medium at a standard dubbing speed without transmitting the basic data to the payment imposing unit when the dubbing speed is the standard dubbing speed.

12. The record/playback method according to claim 11 further comprising the step of:
   generating key data using the payment imposing unit as the data indicative of the completion of imposing payment from the basic data received.

13. The record/playback method according to claim 12 further comprising the steps of:
   judging whether the key data received as the data indicative of the completion of imposing payment is authentic; and
   recording the data onto the second recording medium based on the judging.

14. The record/playback method according to claim 13, further comprising the steps of:
   collating the key data received as the data indicative of the completion of imposing payment with key lock data held within the apparatus to judge the authenticity of the key data; and
   recording the data read out from the first recording medium onto the second recording medium when the key data is judged authentic.

15. The record/playback method according to claim 14 further comprising the steps of:
   recording the data onto the second recording medium according to the data indicative of a speed when the key data is judged authentic.

16. The record/playback method according to claim 12 further comprising the steps of
   canceling imposing payment and generating the key data when the data indicative of a speed in the basic data received is indicative of reading out the data from the first recording medium and recording it onto the second recording medium at a predetermined speed.

17. The record/playback method according to claim 16 further comprising the steps of:
   imposing payment and generating the key data when the data indicative of a speed in the basic data received from the control unit is indicative of reading out data from the first recording medium and recording the read-out data onto the second recording medium at a speed faster than the predetermined speed.

18. The record/playback method according to claim 11 further comprising the step of:
   reading out corresponding data from a data storage unit in response to indicator data supplied from an operating unit and recorded onto the first recording medium.

* * * * *

UNITED STATES PATENT AND TRADEMARK OFFICE
CERTIFICATE OF CORRECTION

| | |
|---|---|
| PATENT NO. | : 7,225,163 B1 |
| APPLICATION NO. | : 09/319093 |
| DATED | : May 29, 2007 |
| INVENTOR(S) | : Min-Jae Han |

It is certified that error appears in the above-identified patent and that said Letters Patent is hereby corrected as shown below:

In Column 4, Line 42, "1 50" should read --150--; and

In Column 12, Line 62, "50" should read --so--.

Signed and Sealed this

Twelfth Day of August, 2008

JON W. DUDAS
*Director of the United States Patent and Trademark Office*